United States Patent [19]

Grunze et al.

[11] Patent Number: 5,667,312

[45] Date of Patent: Sep. 16, 1997

[54] ROLLER BEARING FOR USE IN OSCILLATORY APPLICATIONS

[75] Inventors: Mark R. Grunze, Naperville; Robert B. Warrick, St. Charles, both of Ill.

[73] Assignee: Rexnord Corporation, Milwaukee, Wis.

[21] Appl. No.: 351,029

[22] Filed: Dec. 7, 1994

Related U.S. Application Data

[63] Continuation-in-part of Ser. No. 162,448, Dec. 3, 1993, Pat. No. 5,413,416.

[51] Int. Cl.$^6$ .............................. F16C 19/00; F16C 33/49
[52] U.S. Cl. .......................... 384/450; 384/558; 384/565; 384/572
[58] Field of Search ..................................... 384/450, 565, 384/568, 572, 577, 558, 569, 585, 624

[56] References Cited

U.S. PATENT DOCUMENTS

| | | | |
|---|---|---|---|
| 613,083 | 10/1898 | Smith | 384/565 |
| 1,914,548 | 6/1933 | Wingquist | 384/571 |
| 2,038,079 | 4/1936 | Herrmann | 384/565 |
| 2,387,962 | 9/1945 | Williams | 384/568 |
| 2,586,406 | 2/1952 | Wallgren | 384/568 |
| 2,767,037 | 9/1956 | Williams | 384/482 |
| 2,865,688 | 12/1958 | Lemont, Jr. | 384/565 X |
| 3,046,066 | 7/1962 | Lobeck et al. | 384/577 |
| 3,187,591 | 6/1965 | Johnson | 384/558 |
| 3,667,822 | 6/1972 | Armstrong | 384/565 |
| 3,827,771 | 8/1974 | Fernlund | 384/568 X |
| 3,912,346 | 10/1975 | Boratynski et al. | 384/568 |
| 3,930,693 | 1/1976 | Bowen | 384/567 |
| 3,934,957 | 1/1976 | Derner | 384/563 |
| 3,936,102 | 2/1976 | Riegler et al. | 384/206 |
| 3,938,865 | 2/1976 | Rouverol | 384/550 |
| 3,953,142 | 4/1976 | Price et al. | 403/371 |
| 3,963,285 | 6/1976 | Kellstrom | 384/450 |
| 4,120,542 | 10/1978 | Bhateja et al. | 384/622 |

(List continued on next page.)

FOREIGN PATENT DOCUMENTS

| | | | |
|---|---|---|---|
| 649528 | 8/1937 | Germany. | |
| 3537243 | 4/1987 | Germany. | |
| 60-188617 | 9/1985 | Japan | 384/568 |
| 1521949 | 11/1989 | U.S.S.R. | 384/551 |
| 230800 | 10/1925 | United Kingdom | 384/568 |
| 747314 | 4/1956 | United Kingdom. | |
| 1020520 | 2/1966 | United Kingdom | 384/577 |
| 929146 | 6/1993 | United Kingdom. | |

OTHER PUBLICATIONS

Rollway Product Bulletin, "Nutating Roller Bearings", 1983.

For Design News by David J. Bak, "Nutating Bearing Offsets Oscillating Motion", pp. 126–127, 1984.

SKF Industries, Inc., "SKF Product Guide", pp. 77–78, published Jan., 1985.

*Primary Examiner*—Thomas R. Hannon
*Attorney, Agent, or Firm*—Michael, Best & Friedrich

[57] ABSTRACT

The invention provides a roller bearing apparatus including an inner ring member supported for rotation on a sleeve, an outer ring member, rollers in the raceway space defined between the inner and outer ring members, and a guide member having roller seats against which inboard end portions of the rollers are seated. To promote roller precession when the roller bearing apparatus is used in an oscillatory application, the roller seats are slanted or pitched in a circumferential direction and at least the inboard end portions of the rollers are provided with non-planar, and in one embodiment frustoconical, end faces. Cooperation between the non-planar end faces of the rollers and the pitched roller seats controls the mean skew axes of the rollers to promote consistent roller precession through the bearing load zone, and enables increased freedom of movement of the rollers to minimize friction. This increases the life of the roller bearing by reducing roller related failures. Additionally, when the rollers precess the inner ring member is encouraged to rotate relative to the sleeve to bring new inner race surface portions into the load zone. This reduces inner ring-related failures.

19 Claims, 5 Drawing Sheets

U.S. PATENT DOCUMENTS

| | | | |
|---|---|---|---|
| 4,138,170 | 2/1979 | Markfelder et al. | 384/520 |
| 4,139,317 | 2/1979 | Hafner | 403/352 |
| 4,492,415 | 1/1985 | Baile et al. | 384/463 |
| 4,557,613 | 12/1985 | Taillian et al. | 384/568 |
| 4,705,411 | 11/1987 | Kellstrom | 384/450 |
| 4,714,358 | 12/1987 | Bayer et al. | 384/470 |
| 5,000,587 | 3/1991 | Hawley | 384/4 |
| 5,037,217 | 8/1991 | Dougherty | 384/571 |
| 5,074,680 | 12/1991 | Hoch et al. | 384/580 |
| 5,269,609 | 12/1993 | Holtz et al. | 384/623 |
| 5,290,374 | 3/1994 | Holtz et al. | 148/559 |

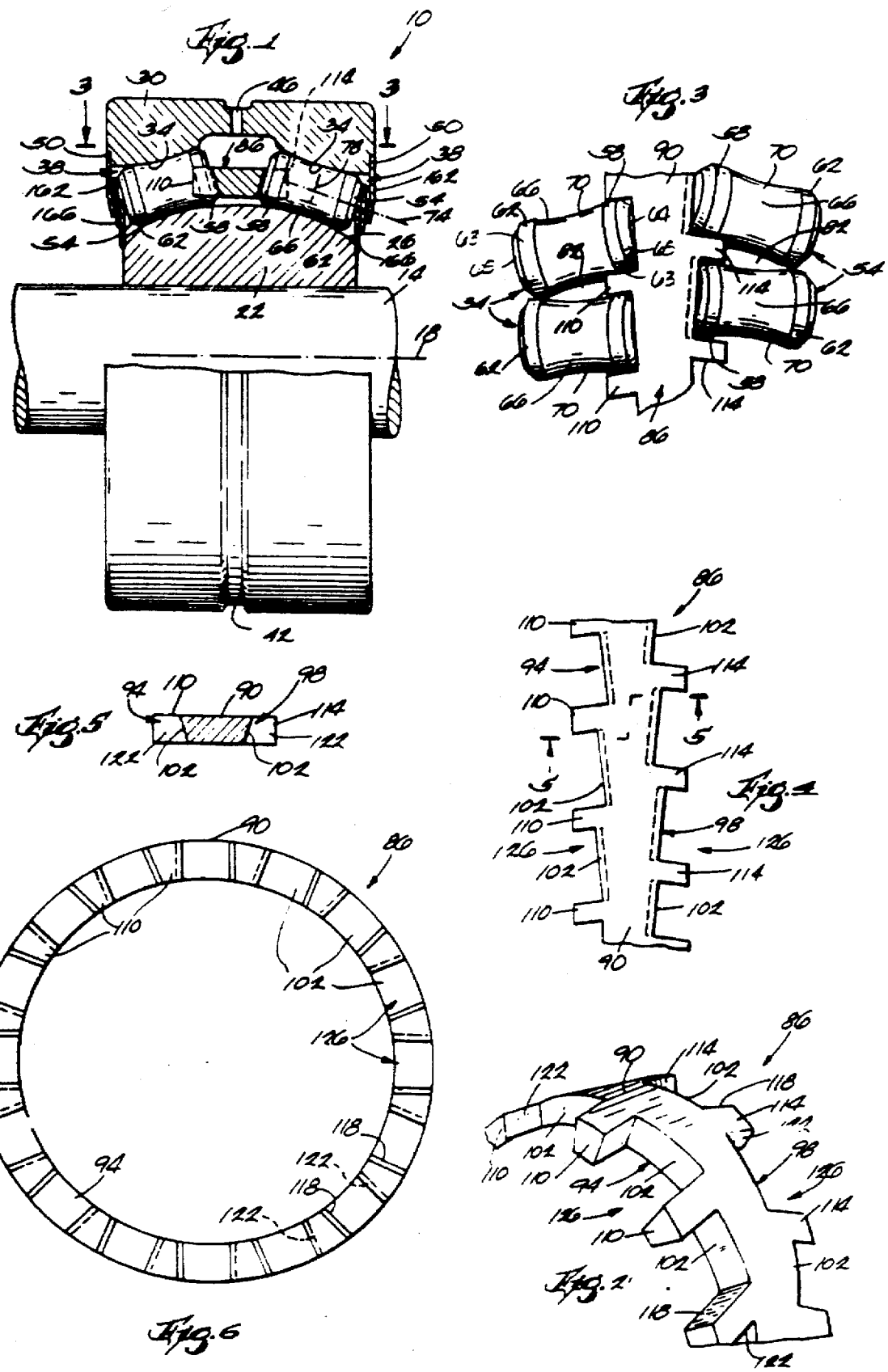

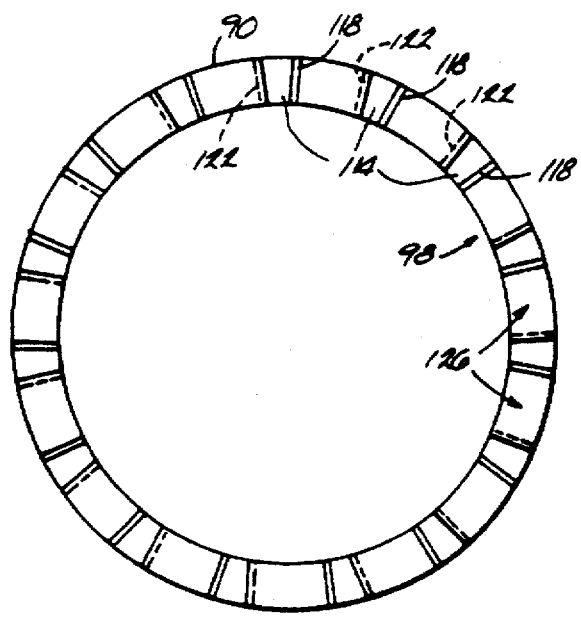
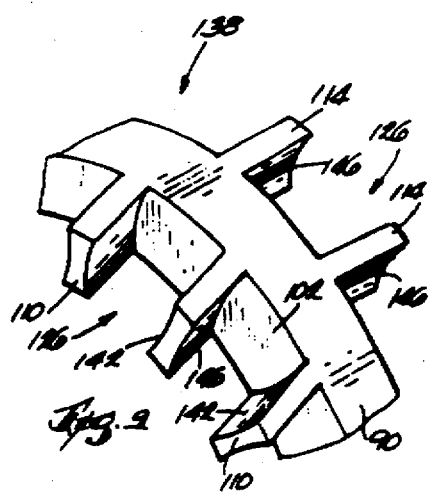
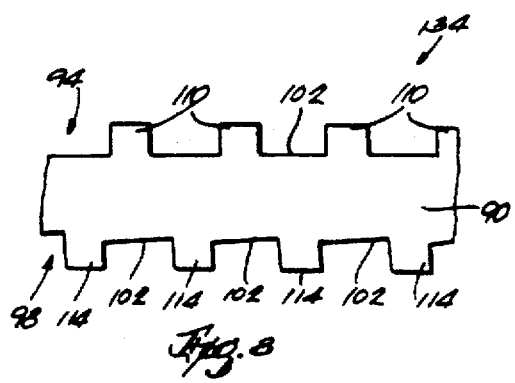
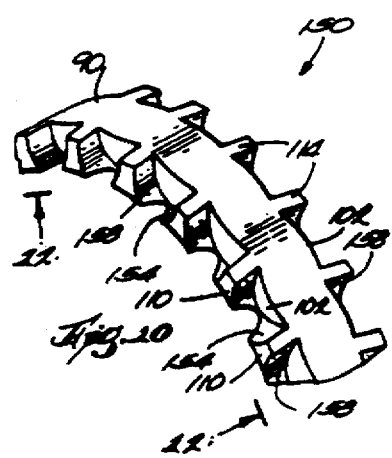
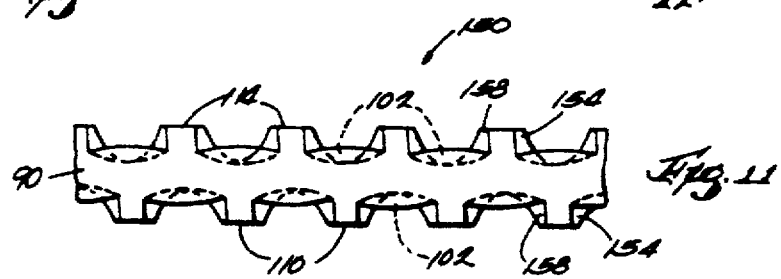
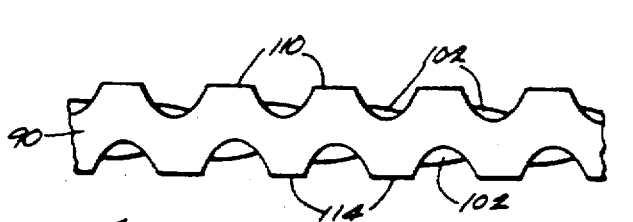

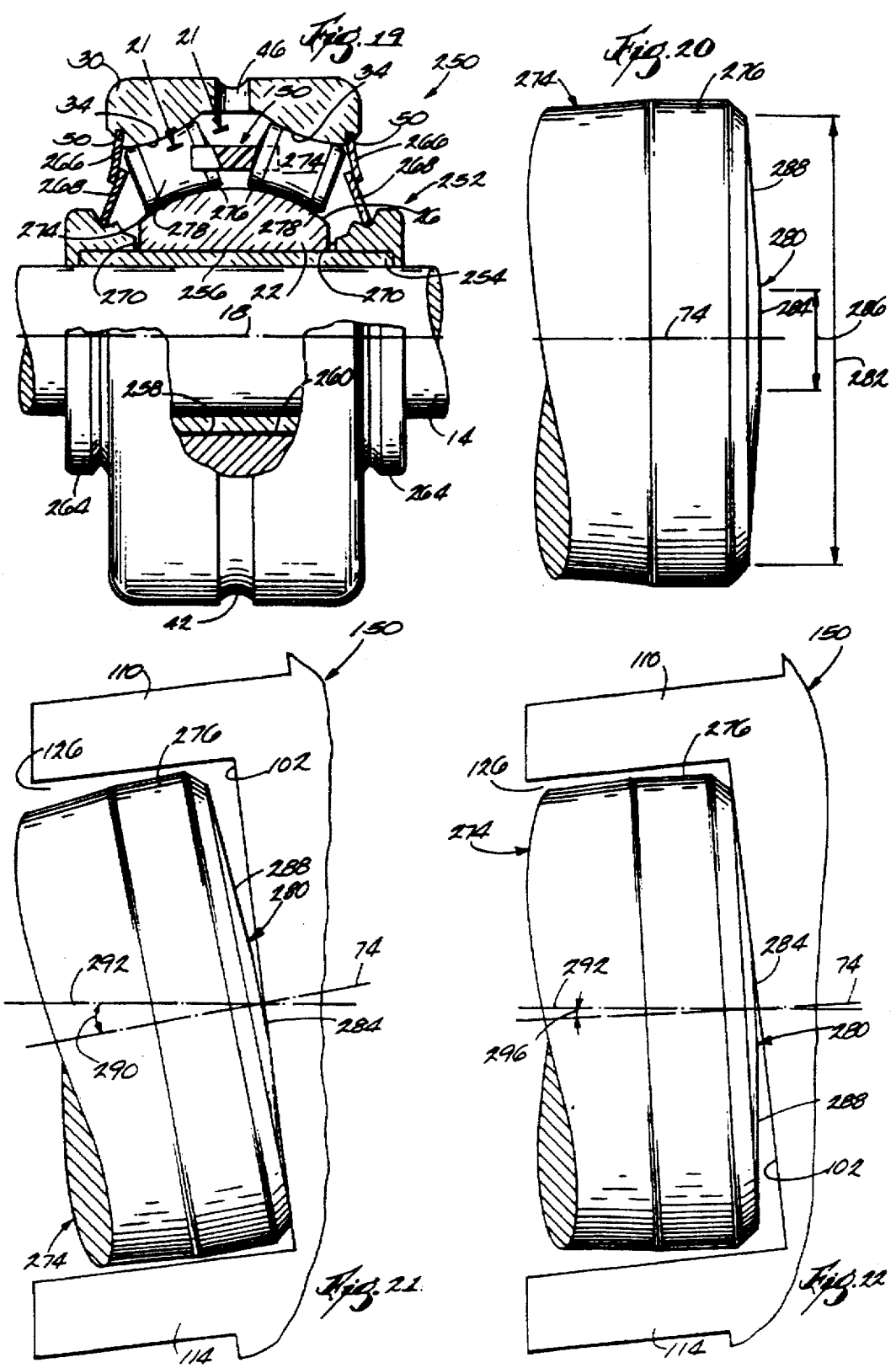

ROLLER BEARING FOR USE IN OSCILLATORY APPLICATIONS

CROSS-REFERENCE TO RELATED APPLICATION

This is a continuation-in-part of U.S. patent application Ser. No. 08/162,448, filed Dec. 3, 1993, and titled "ROLLER GUIDE MEMBER FOR FULL COMPLEMENT ROLLER BEARING", U.S. Pat. No. 5,413,416.

BACKGROUND OF THE INVENTION

1. Field of the Invention

The invention relates generally to roller bearings, and more particularly to roller bearings having components that precess or index when such roller bearings are used in oscillatory applications to cycle those components through the load zones of the bearings.

2. Reference to Prior Art

Examples of self-aligning angular contact roller bearings are provided in U.S. Pat. No. 2,387,962 issued Sep. 28, 1942, U.S. Pat. No. 2,767,037 issued Oct. 16, 1956, and U.S. Pat. No. 4,557,613 issued Dec. 10, 1985. In each of those patents the illustrated roller bearing includes an inner ring that provides a substantially spherical inner race surface, an outer ring having a pair of outer race surfaces with convex curvatures, and a pair of oppositely axially inclined rows of symmetrical, hourglass-shaped rollers. Another example of an angular contact roller bearing is illustrated in U.S. Pat. No. 3,912,346 issued Oct. 14, 1975. That roller bearing includes oppositely axially inclined rows of symmetrical, barrel-shaped rollers.

The foregoing roller bearings also include roller cages or retainers to separate, guide and position the rollers in each row. Each of the retainers includes sets of axially oppositely extending webs or prongs that extend parallel to the axis of the roller bearing. Those prongs fully circumferentially separate the rollers and limit the number of rollers that will fit in a roller bearing.

When in service, loads exerted on a bearing unit such as one of those described above are typically carried by only one part of the bearing unit at a time, that part being referred to as the "load zone". If the bearing unit is used in an oscillatory application it is desired that the rollers in the bearing precess or index so that they are cycled through the load zone. Cycling the rollers results in utilization of the entire race surface of each of the rollers to extend rolling contact fatigue life. Cycling the rollers also redistributes lubrication within the bearing unit which in turn reduces fretting damage and improves the bearing unit's resistance to raceway corrosion.

When the foregoing roller bearings are used in oscillatory applications roller precession is negligible, and while failures in those bearings can be inner ring-related, such as by spalling on the inner race surface for example, or to a lesser extent outer ring-related, the majority of failures are roller-related. To improve aspects of performance of a roller bearing used in an oscillatory application it is known to remove the retainer from that bearing. Removal of the retainer frees space for additional rollers so that loads are carried by a greater number of rollers occupying the load zone. Also, Applicants have determined through testing that the rollers in retainerless roller bearings experience irregular or inconsistent precession (i.e., rollers do not always precess in the same direction or by the same amount) which may bring different rollers into the load zone.

It is also known that improved performance of a roller bearing to be used in an oscillatory application can be achieved by replacing the above-described retainer with a "precessing retainer" in which the webs or prongs are circumferentially inclined. In one known precessing retainer design the prongs are circumferentially inclined at an angle of about 4° to provide an imbalanced amount of skew to the rollers. When the angle of oscillation of the bearing is sufficiently large (i.e., at least 2°–3°) the rollers skewed by the precessing retainer tend to precess or index to continually cycle rollers through the load zone. This reduces the occurrence of roller-related failures and thereby increases the life of the bearing.

SUMMARY OF THE INVENTION

The assignee of the present invention, Rexnord Corporation, has been engaged in research and testing to develop roller bearings which are intended for use in oscillatory applications and which have improved performance over prior art roller bearings used in such applications. Fruits of that on-going effort include the inventions disclosed in the following patent applications: U.S. Pat. No. 5,446,351 filed Oct. 26, 1993, titled "FULL COMPLEMENT SELF-ALIGNING ROLLER BEARING", and relating to, among other things, a retainerless roller bearing having inner and outer race surfaces configured to skew the rollers to achieve adequate roller precession; the abovementioned related U.S. Pat. No. 5,413,416 relating to, among other things, a variety of improved precessing retainer designs, some of which have shortened or "stubby" prongs that are substantially shorter than the prongs in prior art precessing retainers to permit use of up to a full complement of rollers; and the present application.

In particular, the present invention provides a roller bearing apparatus that has improved performance in oscillatory applications and that is designed to optimize bearing operating characteristics while minimizing failure rates of the components of the bearing to achieve longer life. More particularly, the roller bearing apparatus has modified interface areas between the ends of the rollers and the pocket bottoms or roller seats on the retainer. The modified interface areas permit freedom of movement of the rollers while controlling the positions of the mean skew axes of the rollers. That arrangement provides more consistent and reliable roller precession without reducing the rolling contact fatigue life of the rollers or the space needed to accommodate up to a full complement of rollers, and results in further reduced roller-related failures. The modified interface areas are formed by providing either the end faces of the rollers and/or the roller seats with non-planar configurations.

In a preferred embodiment, the end faces of the rollers are provided with frustoconically-shaped end faces that are seated against circumferentially pitched or slanted roller seats. The frustoconically-shaped roller end faces permit increased freedom of movement of the rollers, especially when the roller bearing reverses directions, to minimize friction losses between the rollers and the race surfaces. Additionally, the end faces and the pitched roller seats cooperate to control the mean skew axes of the rollers to promote consistent and reliable precession.

The roller bearing apparatus is also provided with an inner ring assembly that is designed to reduce inner ring-related failures. The inner ring assembly includes an inner ring member that is rotatably mounted with respect to a shaft supported by the bearing. The inner ring member is capable of precessing in conjunction with the rollers so that the entire inner race surface is cycled through the load zone.

In a preferred embodiment, the inner ring assembly includes a sleeve mountable on a shaft and an inner ring member mounted on the sleeve. The bore surface of the inner ring member is sized to provide clearance between the sleeve and the inner ring member to permit substantially free rotation of the inner ring member relative to the sleeve. The inner ring assembly also includes collars on the opposite ends of the sleeve, and the collars are spaced apart to provide gaps at the ends of the inner ring member to minimize interference with rotation of the inner ring member.

More particularly, in one embodiment the invention provides a roller bearing apparatus including inner and outer ring members defining a raceway space therebetween, a plurality of rollers in the raceway space, and an annular guide member for the rollers. The guide member is provided with roller seats against which inboard end portions of the rollers are seated. To promote roller precession, improved means are provided at the interfaces of the inboard end portions of the rollers and the roller seats for controlling the mean skew angles of the rollers, and in particular for imparting non-zero mean skew angles to the rollers when the roller bearing apparatus is used in an oscillatory application. Such means can be provided, for example, by circumferentially slanting or pitching the roller seats and/or roller prongs on the guide member to bias roller skew, or by providing the roller seats with non-planar surfaces. In a preferred embodiment such means are provided by combining circumferentially pitched roller seats with rollers having nonplanar inboard end faces seated against the roller seats.

The invention also provides a precessing roller design wherein the roller includes opposite inboard and outboard end portions, at least the end face of the inboard end portion having a non-planar configuration. In one embodiment, that end face has a diameter, a central surface portion perpendicular to the axis of the roller and extending over a minor portion of the diameter, and an outer surface portion transverse to the central surface portion, the outer surface portion extending over a major portion of the diameter. In a preferred embodiment the end face is frustoconically-shaped.

The invention further provides a roller bearing apparatus including an outer ring, an inner ring that forms part of a precessing inner ring assembly, and a plurality of rollers in the raceway space defined between the inner and outer ring members. The inner ring assembly also includes a sleeve mountable on a rotatable shaft to be supported by the roller bearing apparatus, and the inner ring member is supported for rotation on the sleeve. The inner ring assembly is also provided with retaining structure on the opposite end portions of the sleeve. The retaining structure is spaced from the inner ring member to define axially extending gaps on the opposite sides of the inner ring member. The gaps limit retaining structure interference with rotation of the inner ring member relative to the sleeve. When used in a bearing apparatus having precessing rollers movement of those rollers causes the inner ring member to rotate on the sleeve to cycle new inner race surface portions through the bearing load zone.

Various other features and advantages of the invention will become apparent to those skilled in the art upon review of the following detailed description, claims and drawings.

BRIEF DESCRIPTION OF THE DRAWINGS

FIG. 1 a side elevational view, partially broken away and in section, of a roller bearing apparatus in accordance with a first embodiment of the invention and shown supporting a shaft.

FIG. 2 is an enlarged perspective view of a portion of the guide member illustrated in FIG. 1.

FIG. 3 is an enlarged top plan view taken along line 3—3 in FIG. 1 and showing portions of the guide member and the rows of rollers.

FIG. 4 is a view of the guide member portion similar to FIG. 3 but with the guide member portion shown flattened for clarity.

FIG. 5 is a view taken along line 5—5 in FIG. 4.

FIG. 6 is an enlarged elevational view of the guide member illustrated in FIG. 1.

FIG. 7 is an enlarged elevational view of a first modified version of the guide member illustrated in FIGS. 1–6.

FIG. 8 is a top plan view, shown flattened for clarity, of a portion of a second modified version of the guide member illustrated in Figs. 1–6.

FIG. 9 is a perspective view of a portion of a third modified version of the guide member illustrated in FIGS. 1–6.

FIG. 10 is a perspective view of a portion of a fourth modified version of the guide member illustrated in FIGS. 1–6.

FIG. 11 is a top plan view of the guide member illustrated in FIG. 10 and shown flattened for clarity.

FIG. 12 is a view taken along line 12—12 in FIG. 10 and shown flattened for clarity.

FIG. 19 is a side elevational view similar to FIG. 1 and illustrates a roller bearing apparatus in accordance with a fifth embodiment of the invention.

FIG. 20 is an enlarged view of the inboard end portion of one of the rollers illustrated in FIG. 19.

FIGS. 21 and 22 are enlarged views taken generally along line 21—21 in FIG. 19 and illustrate the roller of FIG. 20 seated in alternative positions in a roller pocket on the guide member.

Figure 13:
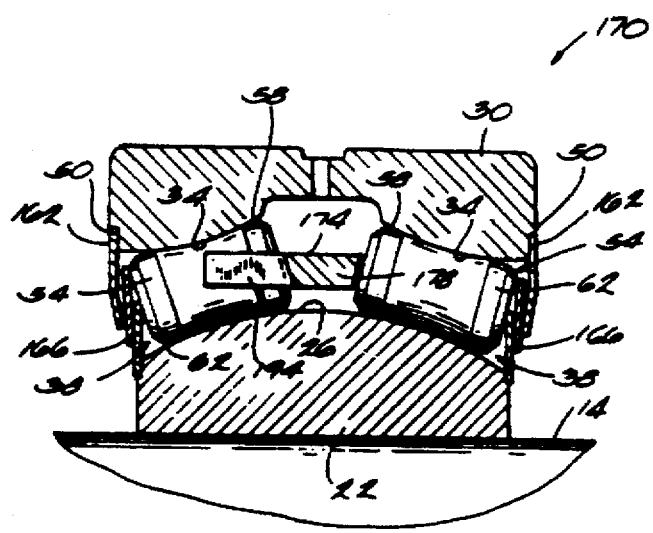
FIG. 13 is a half-sectional view of a roller bearing apparatus in accordance with a second embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a roller bearing apparatus 10 which is shown supporting a rotating or oscillating shaft 14. In the particular embodiment illustrated in the drawings, the bearing apparatus 10 is an angular contact internally self-aligning bearing having an axis 18.

As shown in FIG. 1, the roller bearing apparatus 10 includes an annular inner race or ring member 22 through which the shaft 14 extends. The inner ring member 22 includes an arcuate outer surface forming an inner bearing race surface 26 which in the illustrated arrangement is substantially spheroidal. The roller bearing apparatus 10 also includes an annular outer race or ring member 30 encircling the inner ring member 22. The outer ring member 30 includes a pair of axially oppositely inclined, arcuate outer bearing race surfaces 34 each opposing the inner race surface 26 to provide a pair of raceway spaces 38. The outer race surfaces 34 are of generally convex curvature as seen in FIG. 1.

To facilitate periodic lubrication of the bearing apparatus 10, an annular groove 42 is provided on the outer circumferential side of the outer ring member 30 and a hole 46 communicates between the groove 42 and the interior of the roller bearing apparatus 10. A desired lubricant can be injected into the groove 42 by suitable means such as a grease gun (not shown), as is described in aforementioned U.S. Pat. No. 2,767,037. For reasons explained hereinafter, the outer ring member 30 also includes notches 50 in its opposite sides.

The roller bearing apparatus 10 also includes a plurality of rollers 54. While the rollers 54 can have other configurations such as a barrel-shaped configuration for example, in the illustrated arrangement each of the rollers 54 is generally hourglass-shaped. More particularly, each of the rollers 54 includes opposite inboard and outboard end portions 58 and 62. In the particular arrangement illustrated in the drawings, the inboard and outboard end portions 58 and 62 are preferably identical and each includes (see FIG. 3) a cylindrical portion 63, a planar end surface or face 64, and a chamfered portion 65 extending from the cylindrical portion 63 to the end face 64. Each of the rollers 54 also includes a midsection 66 with an arcuate outer surface 70 having a concave longitudinal profile. Each of the rollers 54 also has (FIG. 1) a longitudinal axis 74 and is symmetric about a plane which is perpendicular to the axis 74 and which includes a line 78 at the midpoint of the roller The rollers 54 are arranged in the raceway spaces 38 in annular rows. As shown in FIG. 1, the annular rows are oppositely axially inclined such that each row tapers in an axially outward direction. As a result (see FIG. 3), the end portions 58 of the rollers 54 on the larger diameter side of each row are more circumferentially spaced apart (i.e., define spaces 82 therebetween) than are the end portions 62 on the smaller diameter side of the row. As shown in FIG. 3, substantially no space exists between the rollers 54 at the small diameter side of the row and each end portion 62 normally contacts adjacent rollers 54 during operation of the roller bearing apparatus 10.

While the number of rollers 54 in each row can vary, each row preferably includes a full complement of rollers (i.e., sixteen rollers 54 in the particular embodiment shown in FIG. 1). By maximizing the number of rollers 54 in each row full use is made of the available raceway space.

The roller bearing apparatus 10 also includes a guide member 86 positioned between the annular rows of rollers 54. As shown in FIGS. 2–6, the guide member 86 includes a base web or ring 90 having opposite radially extending sides 94 and 98. The radial sides 94 and 98 taper radially inwardly (see FIG. 5) at an angle about equal to the angle of taper of the annular rows of rollers 54 (i.e., about 18.5° in the illustrated arrangement). Each of the radial sides 94 and 98 includes separate surface portions or roller seats 102 against which the rollers 54 are located. In addition to being tapered radially inwardly, the roller seats 102 are slanted or pitched (FIG. 4) in a circumferential direction for reasons more fully explained below.

The guide member 86 also includes means for skewing the rollers 54 (i.e., pivoting the rollers 34 about their respective midpoint lines 78) in one or both of the annular rows. To promote precessing or indexing of the rollers 54 when the roller bearing apparatus 10 is used in an oscillatory application, the means for skewing the rollers 54 also imparts non-zero mean skew angles to the rollers 54.

In the illustrated arrangement, the means for skewing the rollers 54 is located at the interfaces of the rollers 54 and the guide member 86 and includes the roller seats 102. In the illustrated arrangement the means for skewing also includes a first set of prongs or stubs 110 extending in one axial direction (i.e., to the left in FIG. 1) from the ring 90, and a circumferentially offset second set of prongs or stubs 114 extending in the opposite axial direction (i.e., to the right in FIG. 1) from the ring 90. The stubs 110 and 114 separate the roller seats 102 on the opposite sides 94 and 98 of the ring 90, and each of the stubs 110 and 114 includes (FIG. 6) opposite sides 118 and 122 that taper radially inwardly. In the embodiment illustrated in FIGS. 1–6, the stubs 110 and 114, like the roller seats 102, are circumferentially angled or slanted relative to the ring 90. In particular, the roller seats 102 are slanted in the same direction and by about the same amount as the stubs 110 and 114. In the illustrated arrangement that amount is about 4.5°.

The stubs 110 and 114 define therebetween (FIGS. 2, 4 and 6) pockets 126 which are likewise slanted or skewed about 4.5°, and the roller seats 102 form pocket bottoms. The rollers 54 are received in the skewed pockets 126 and seated against the roller seats 102 so that the rollers 54 are also skewed about 4.5°. Applicants have discovered through testing that in this arrangement the rollers 54 exhibit consistent, unidirectional precessing or indexing characteristics when the bearing 10 is employed in oscillatory applications.

While the guide member 86 is provided with both slanted roller seats 102 and slanted stubs 110 and 114 to skew the rollers 54, in other embodiments guide members can be provided alternatively with slanted roller seats, slanted stubs, or other structure for imparting non-zero mean skew angles to the rollers 54 to achieve precession.

As shown in FIG. 3, the stubs 110 and 114 extend into the spaces 82 between the rollers 54 to provide substantially uniform circumferential spacing between the inboard end portions 58. The stubs 110 and 114 preferably do not, however, extend so far as to separate or interfere with engagement between the outboard end portions 62. In particular, the stubs 110 and 114 are considerably shorter than the prongs in prior art arrangements and in the illustrated arrangement are (FIG. 1) substantially less than half the length of the rollers 54. In other arrangements, the length of the stubs 110 and 114 can vary depending upon the size of the spaces 82 between the rollers 54. For example, in the roller bearing apparatus 10 the number of rollers 54 constituting a full complement is determined in part by the circumference of the narrow side of each row of rollers. If the rows were to taper more sharply, the number of rollers constituting a full complement could decrease, in which case the spaces between the end portions 58 of the rollers 54 at the wide side of the row increase such that the length of the stubs 110 and 114 may be increased somewhat.

The guide member 86 can be made of any suitable material and in the illustrated embodiment is preferably made of bronze. In other embodiments the guide member 86 can be made of other metals or even plastics which are more easily formed than metals.

While guide member 86 is designed for use with a full complement of skewed rollers 54, it can be modified in various ways to accommodate any desirable number of rollers, some of which need not be skewed, to reduce manufacturing time and costs, to decrease friction in the bearing, or to otherwise improve bearing performance. For example, FIG. 7 illustrates a guide member 130 which is similar to guide member 86, but which has been modified for use with opposite annular rows each including less than a full complement of rollers. In particular, in guide member 130 there are only fifteen of each of the stubs 110 and 114 to accommodate rows of only fifteen rollers 34 (instead of a full complement of sixteen). The stubs 110 and 114 in guide member 130 are slightly more circumferentially spaced apart than in guide member 86 so that there is more available space between the rollers 54. That extra space can be used for additional lubricant, if desired, or to increase freedom of movement of the rollers to minimize friction.

Illustrated in FIG. 8 is a guide member 134 which is similar to guide member 86 (FIG. 4) but which has been modified for easier, more inexpensive manufacture. In particular, the stubs 110 and the roller seats 102 on side 94 of guide member 134 are not circumferentially angled with respect to the ring 90. When guide member 134 is used in a roller bearing it is expected that the rollers 54 received between the straight stubs will follow precession of the rollers 54 between the slanted stubs 114 despite not being normally skewed by guide member 134.

Illustrated in FIG. 9 is a guide member 138 in accordance with a third modified version of guide member 86. In guide member 138, the stubs 110 and 114 have concave sides 142 and 146 instead of the planar sides 118 and 122 of guide member 86 to provide more well-defined pockets 126.

Illustrated in FIGS. 10–12 is a guide member 150 in accordance with a fourth modified version of the guide member 86. The stubs 110 and 114 of guide member 150 have concave sides 154 and 158 that are extended relative to the concave sides 142 and 146 of guide member 138 (FIG. 7).

The roller bearing apparatus 10 also includes means for containing lubricant and for preventing contaminants from entering the raceway spaces 38. In the illustrated arrangement such means includes annular shield members 162 each seated in one of the notches 50 and annular seals 166 each mounted on one of the shield members 162.

Illustrated in FIG. 13 is a roller bearing apparatus 170 in accordance with a second embodiment of the invention. Roller bearing apparatus 170 is similar to roller bearing apparatus 10 (FIG. 1) except that guide member 86 (FIG. 1) is replaced with a retainer 174 (FIG. 13), and roller bearing apparatus 170 has a larger diameter (such that a full complement of rollers is in excess of sixteen). Hence, the same reference numerals are used for elements common to both bearing apparatus.

Figure 14:
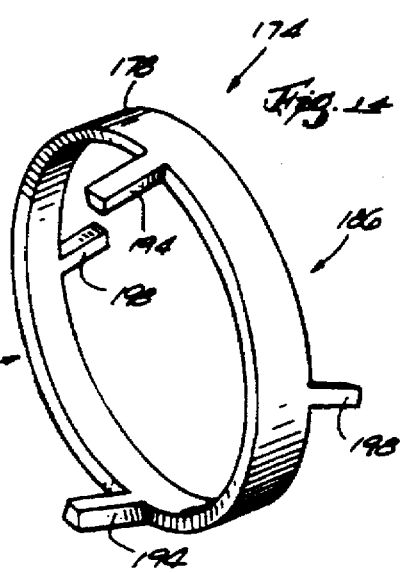
FIG. 14 is a perspective view of the retainer illustrated in FIG. 13.

As shown in FIG. 14, the retainer 174 includes a ring 178 having sides 182 and 186 that taper radially inwardly. The sides 182 and 186 can, if desired, include discrete circumferentially slanted surface portions (not shown) similar to roller seats 102 to give the sides 182 and 186 a generally sawtooth configuration. The retainer 174 also includes prongs that may number as few as one, but that in the illustrated embodiment include a first pair of prongs 194 extending in one axial direction from the ring 178 and a second pair of prongs 198 extending in the opposite axial direction from the ring 178. The prongs 194 and 198 are circumferentially angled (at about 4° in the illustrated embodiment) with respect to the ring 178 to impart skew to the rollers 54. The prongs 198 are offset 90° with respect to the prongs 194 so that precessing or indexing of the rollers 54 is substantially consistent regardless of the particular angular position of the retainer 174 in the roller bearing apparatus 170.

Figure 15:
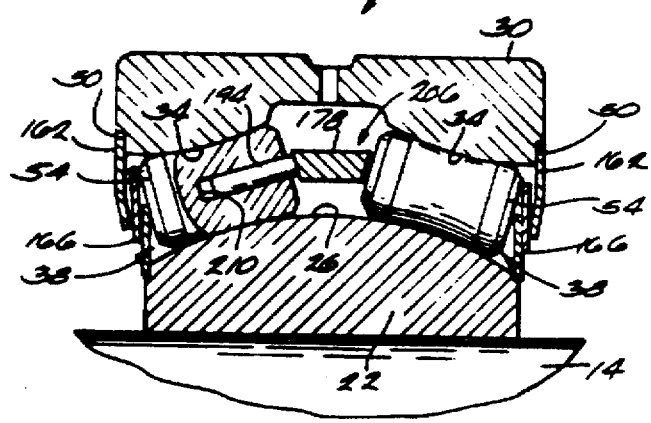
FIG. 15 is a half-sectional view of a roller bearing apparatus in accordance with a third embodiment of the invention and including a first modified version of the retainer illustrated in FIGS. 13 and 14.
Figure 16:
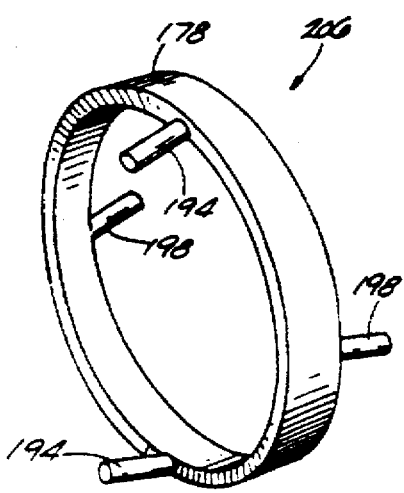
FIG. 16 is a perspective view of the retainer illustrated in FIG. 15.

Illustrated in FIG. 15 is a roller bearing apparatus 202 in accordance with a third embodiment of the invention and including a retainer 206 which is a modified version of the retainer 174 shown in FIGS. 13 and 14. As shown in FIG. 16, the prongs 194 and 198 of retainer 206 have circular cross-sections and fit (FIG. 15) within cylindrical bores 210 provided in selected ones of the rollers 54. By inserting the prongs 194 and 198 into the rollers 54, the retainer 206 does not restrict the number of rollers that can be used in the bearing apparatus 202. Thus, a full complement of rollers 54 can be used if desired.

Figure 17:
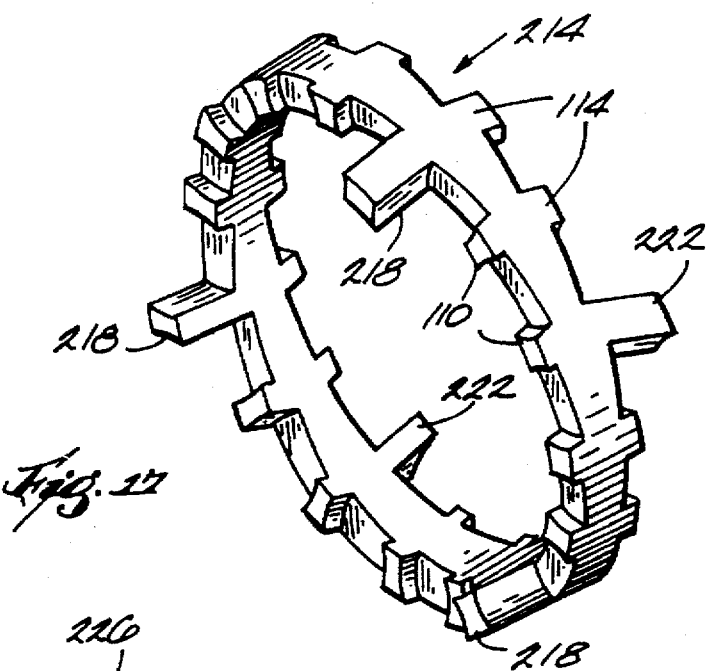
FIG. 17 is a perspective view of a portion of a second modified version of the retainer illustrated in FIGS. 13 and 14.

Illustrated in FIG. 17 is a retainer 214 that is a hybrid of guide member 138 (FIG. 7) and retainer 174 (FIG. 14). In particular, the stubs 110 and 114 are not circumferentially offset and three of the stubs 110 and 114 on each side of the retainer 214 have been lengthened to provide prongs 218 and 222. Retainer 214 is expected to provide improved roller precessing relative to retainer 174 while accommodating roller numbers approaching the full complement that can be used with guide member 138.

Figure 18:
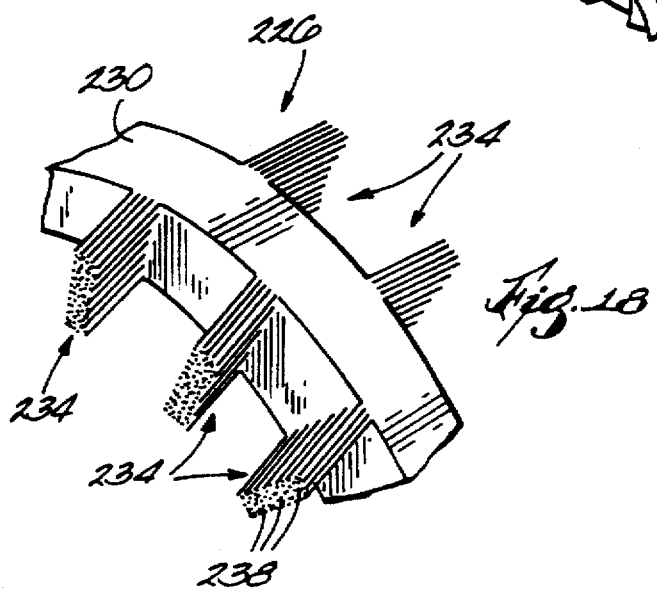
FIG. 18 is a perspective view of a portion of a retainer in accordance with a fourth embodiment of the invention.

Illustrated in FIG. 18 is a retainer 226 in accordance with a fourth embodiment of the invention. The retainer 226 is made of a plastic material and includes a ring 230 and flexible prongs 234. In the illustrated arrangement the prongs 234 are brush-like members each formed from a number of bristles 238. The bristles 238 permit the prongs 234 to easily deform when engaged by a roller to fill unused areas in the raceway spaces so that the number of rollers in a roller bearing including the retainer 226 is no more than minimally affected by the presence of the prongs 234. The prongs 234 are also preferably angled to encourage roller skew, and it is believed that the roller skew generated by the prongs 234 will be sufficient for adequate roller precessing or indexing.

Advantageously, the guide members 86, 130, 134, 138 and 150, the retainers 174, 206, 214 and 226, and variations of thereof can be used in various roller bearing units to maximize the space available for rollers. That available space can be filled with up to a full complement of rollers to improve the load rating of the bearing unit, and/or additional lubricant can be provided. Additionally, the guide members and retainers of the present invention are designed to help achieve substantially consistent, unidirectional precessing or indexing of the rollers 54 by imparting non-zero mean skew angles to the rollers 54. That feature, which encourages the rollers 54 to cycle through the load zone, increases the life and durability of the bearing unit.

Illustrated in FIG. 19 is a roller bearing apparatus 250 in accordance with a fifth embodiment of the invention. Roller bearing apparatus 250 is similar in many respects to roller bearing apparatus 10 (FIG. 1) and only differences between those bearing apparatus will be discussed in detail, and the same reference numerals are used for elements common to both bearing apparatus.

As shown in FIG. 19, roller bearing apparatus 250 includes an inner ring assembly 252. The inner ring assembly 252 includes a sleeve 254 that is mounted on the shaft 14 for rotation therewith and that is preferably made of a suitable bearing material, such as beryllium copper for example. The inner ring assembly 252 also includes the inner ring member 22 which is provided with an inner diameter surface 256 that defines a bore 258 for receiving the sleeve 254. In the illustrated arrangement, the inner diameter surface 256 is slightly larger in diameter than the sleeve 254 and the two define a small clearance space 260 therebetween so that the inner ring member 22 is substantially freely rotatable on the sleeve 254.

The inner ring assembly 252 is also provided with retaining structure which in the illustrated arrangement includes a pair of collars 264. The collars 264 are mounted on the opposite end portions of the sleeve 254 and, together with the outer ring member 30, support opposite shields 266 and seals 268. To limit interference with rotation of the inner ring member 22 relative to the sleeve 254, the collars 264 are spaced apart in the axial direction a distance greater than the axial width of the inner ring member 22. Thus, axially extending running gaps 270 are provided between each of the collars 264 and the inner ring member 22.

To utilize the entire inner race surface 26, means are provided for precessing the inner ring member 22 when the shaft 14 oscillates so that new portions of the inner race surface are brought into the load zone of the roller bearing apparatus 250. While other means for precessing the inner ring member 22 could be employed, in the illustrated arrangement the same means used to precess the rollers (i.e., the above or below described means for skewing the rollers) also causes the inner ring member 22 to precess. In particular, as the rollers precess they exert a force on the inner ring member 22 which causes it to rotate in a direction opposite roller precession.

Advantageously, the precessing inner ring assembly 252 decreases inner ring-related failures and bearing life by utilizing the entire inner race surface 26 and uses no more space than other inner race designs. The precessing inner ring assembly 252 also provides a secondary bearing in the event of roller-related failure.

Roller bearing apparatus 250 also includes a guide member which in the illustrated arrangement is guide member 150 (FIGS. 10–12), and a plurality of rollers 274. The rollers 274 are similar to rollers 54 (FIGS. 1 and 3) but are provided with modified end faces 280, the inboard ones of the end faces being seated against corresponding roller seats 102 on guide member 150. While the opposite inboard and outboard end faces 280 of rollers 274 can have different configurations, in the embodiment illustrated in FIG. 19 those end faces are identical and only the inboard end face 280 will be described in detail.

As shown in FIG. 20, the inboard end face 280 of each of the rollers 274 has a diameter 282 and a central surface portion 284 that is perpendicular to the roller axis 74 and that extends over a minor portion of the diameter 282 (i.e., has a diameter 286 less than half the diameter 282). The inboard end face 280 also includes an outer surface portion 288 that extends over a major portion of the diameter 282. In the illustrated arrangement, the outer surface portion 288 is frustoconical to give the inboard end face 280 a non-planar configuration.

In the embodiments illustrated in FIGS. 1–18, means independent of the rollers 54 are provided on the various guide members for skewing the rollers 54 to impart non-zero mean skew angles to the rollers 54. While the above-described means for skewing the rollers can also be employed in roller bearing apparatus 250, in a preferred embodiment the means for skewing the rollers 274 in roller bearing apparatus 250 also includes the non-planar inboard end faces 276 of the rollers 274.

Referring to FIGS. 21 and 22, each roller 274 is pivotable such that the entire non-planar surface of the inboard end face 280 is engagable with the corresponding roller seat 102, and the roller pocket 126 provides sufficient clearance to permit that range of movement. When the shaft 14 is rotated in one direction, frictional forces cause the roller 274 to pivot about its line 78 (not shown in FIGS. 21 and 22) to a first position (FIG. 21). In the first position part of the frustoconical surface portion 288 engages the roller seat 102 to form a roller skew angle 290 between the roller axis 74 and a line 292 that extends parallel to the bearing axis 18. When the shaft 14 is rotated in the opposite direction frictional forces cause the roller 274 to pivot to a second position (FIG. 22) wherein the frustoconical surface portion 288 engages the roller seat 102 to form a roller skew angle 296. The mean skew angle averaged over time lies between the values for skew angles 290 and 296.

Testing conducted by Applicants confirms that roller bearing apparatus including rollers 274 and guide member 150 have significantly improved rolling contact fatigue lives and precession characteristics. While the reason for this is not fully understood, a possible explanation lies in optimization of the mean skew angle that is achieved by giving the rollers 274 greater freedom of movement. That greater freedom of movement is promoted by the non-planar inboard end faces 280. Also, the increased freedom of roller movement is believed to allow the rollers 274 to more readily shift to and remain in positions of minimal friction. This maximizes the rolling contact fatigue life of the rollers 274.

Figure 23:
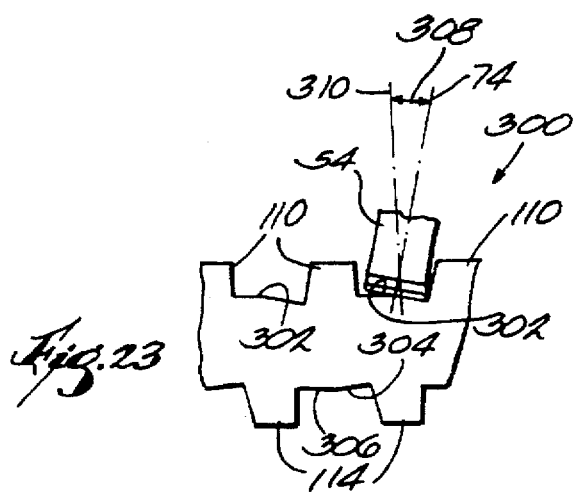
FIG. 23 is a top plan view, similar to FIG. 4, of a portion of a guide member in accordance with a sixth embodiment of the invention.

Illustrated in FIG. 23 is a guide member 300 in accordance with a sixth embodiment of the invention. The guide member 300 is similar to guide member 86 (FIGS. 2–6) except that only one side of each of the prongs 110 and 114 is slanted, and guide member 300 includes non-planar roller seats 302. In particular, each of the roller seats 302 includes a circumferentially pitched or slanted surface portion 304 and a surface portion 306 that is not circumferentially slanted.

It is believed that an alternative bearing arrangement having operating characteristics similar to roller bearing apparatus 250 can be produced by replacing guide member 150 and rollers 274 with guide member 300 and rollers 54. As shown schematically with reference to FIG. 23, when a roller bearing apparatus including the retainer 240 is used in an oscillatory application each roller 54 generally seats against the surface portion 304 of the corresponding roller seat 302 when the bearing apparatus rotates in one direction. In that position the axis 74 of the roller 54 is circumferentially slanted (i.e., has a non-zero skew angle 308 formed between the roller axis 74 and a line 310 parallel to the bearing axis 18) in the same direction as the surface portions 304. When the bearing apparatus is rotated in the opposite direction each of the rollers 54 generally seats against the surface portion 306 of the corresponding roller seat 242. While not shown, one skilled in the art will understand that in that position the axis 74 of the roller 54 has a skew angle of 0°. The mean skew angle of the roller 54 is therefore non-zero to promote precession of the rollers 54 as the bearing apparatus oscillates, and the freedom of movement of the roller is enhanced by the non-planar roller seat 302.

Other features and advantages of the invention are set forth in the following claims.

We claim:

1. A roller bearing apparatus for use in an oscillatory application, the roller bearing apparatus comprising:

an inner ring member, the inner ring member including an inner race surface, an outer ring member, the outer ring member including an outer race surface, and the inner and outer ring members defining therebetween an annular raceway space, an annular guide member, the annular guide member including opposite radially extending sides, at least one of the radially extending sides including a plurality of roller seats, a plurality of rollers in the raceway space and supported between the inner race surface and the outer race surface, each of the rollers including opposite inboard and outboard end faces, the inboard end face of each of the rollers being seated against a corresponding one of the roller seats, and means on the inboard end faces of the rollers for imparting non-zero mean skew angles to the rollers when the roller bearing apparatus is used in an oscillatory application.

2. A roller bearing apparatus as set forth in claim 1 wherein the inboard end face of each of the rollers is non-planar, and the entirety of the inboard end face of each of the rollers is engagable with the corresponding one of the roller seats, and wherein the means at the inboard end faces of the rollers for imparting non-zero mean skew angles to the rollers includes the non-planar inboard end faces of the rollers.

3. A roller bearing apparatus as set forth in claim 2 wherein each of the roller seats includes a circumferentially slanted surface, and wherein the means at the interfaces between the inboard end faces of the rollers and the roller seats for imparting non-zero mean skew angles to the rollers includes the circumferentially slanted surfaces of the roller seats.

4. A roller bearing apparatus as set forth in claim 1 wherein each of the roller seats is non-planar and includes a circumferentially slanted surface portion, and a surface portion that is transverse to the circumferentially slanted surface portion, and wherein the means between the inboard end faces of the rollers for imparting non-zero mean skew angles to the rollers includes the circumferentially slanted surface portions and the surface portions that are transverse to the circumferentially slanted surface portions.

5. A roller bearing apparatus as set forth in claim 1 wherein each of the roller seats includes a circumferentially slanted surface, and wherein the means at the inboard end faces of the rollers for imparting non-zero mean skew angles to the rollers includes the circumferentially slanted surface of each of the roller seats, and a frustoconical surface portion on the inboard end face of each of the rollers.

6. A roller bearing apparatus as set forth in claim 5 wherein the entirety of the frustoconical surface portion on each of the rollers is engagable with the circumferentially slanted surface of the corresponding one of the roller seats.

7. A roller bearing apparatus as set forth in claim 1 and further including an inner ring assembly, the inner ring assembly including the inner ring member, and a sleeve mountable on a rotatable shaft to be supported by the roller bearing apparatus, the inner ring member being supported on the sleeve so that the inner ring member is rotatable relative to the sleeve.

8. A roller bearing apparatus as set forth in claim 7 wherein the sleeve includes opposite axially spaced apart end portions, and the inner ring assembly includes a pair of collars positioned on the opposite axially spaced apart end portions of the sleeve, the inner ring member including an axial width, and the collars being spaced apart a distance in an axial direction which is greater than the axial width of the inner ring member, and wherein the means at the interfaces between the inboard end faces of the rollers and the roller seats for imparting non-zero mean skew angles to the rollers also serves as a means for precessing the inner ring member when the roller bearing apparatus is used in an oscillatory application.

9. A roller bearing apparatus comprising:

an inner ring member;

an outer ring member, the inner and outer ring members defining therebetween an annular raceway space;

an annular guide member positioned in the raceway space, the annular guide member including opposite radially extending sides, at least one of the radially extending sides including a plurality of roller seats, each of the roller seats including a circumferentially slanted surface, and a plurality of rollers supported in the raceway space by the inner and outer ring members, each of the rollers including opposite inboard and outboard end faces, the inboard end face of each of the rollers being seated against a corresponding one of the roller seats, the inboard end face of each of the rollers being non-planar, and the entire inboard end face of each of the rollers being engagable with the circumferentially slanted surface of the corresponding one of the roller seats.

10. A roller bearing apparatus as set forth in claim 9 wherein the inboard end face of each of the rollers includes a frustoconical surface portion.

11. A roller bearing apparatus for supporting a shaft, the roller bearing apparatus comprising:

an inner ring assembly, the inner ring assembly including a sleeve mountable on a shaft to be supported by the roller bearing apparatus, and an inner ring member, the inner ring member including an inner race surface, and the inner ring member being supported on the sleeve so that the inner ring member is rotatable relative to the sleeve, an outer ring member encircling the inner ring member, the outer ring member including an outer race surface, and the inner and outer ring members defining therebetween a raceway space, an annular roller guide member positioned in the raceway space, a plurality of rollers arranged in an axially inclined annular row in the raceway space, each of the rollers being supported by the inner and outer race surfaces, and each of the rollers including opposite inboard and outboard end faces, and means for precessing the rollers and the inner ring member when the roller bearing apparatus is used in an oscillatory application, the means for precessing the rollers and the inner ring member including a plurality of circumferentially slanted roller seating surfaces on the roller guide member, the inboard end face of each of the rollers being seated against one of the circumferentially slanted roller seating surfaces, and a nonplanar surface portion on each of the inboard end faces of the rollers, the circumferentially slanted roller seating surfaces on the annular guide member and the non-planar surface portions on the inboard end faces of the rollers cooperating to provide each of the rollers with a non-zero mean skew angle when the roller bearing apparatus is oscillated.

12. A roller bearing apparatus as set forth in claim 11 wherein the inboard end face of each of the rollers includes a frustoconical surface portion.

13. A roller bearing apparatus as set forth in claim 11 wherein the sleeve includes opposite axially spaced apart end portions, wherein the inner ring assembly includes retaining structure on the opposite axially spaced apart end portions of the sleeve for limiting axial movement of the inner ring member, the retaining structure and the inner ring member defining therebetween an axially extending gap to limit retaining structure interference with rotation of the inner ring member relative to the sleeve.

14. A roller bearing including a guide member having a roller seat and a roller disposed in the roller seat, said roller seat including a surface, the roller comprising:

an axis, and opposite end portions spaced apart along the axis, one of the opposite end portions including an end face adapted to be seated against the surface of the roller seat, the end face having a diameter, and the end face including a central surface portion perpendicular to the axis, the central surface portion extending over a minor portion of the diameter, and an outer surface portion transverse to the central surface portion, the outer surface portion extending over a major portion of the diameter, the surface of the roller seat being non-complementary to the end face of the roller.

15. The roller bearing as set forth in claim 14 wherein the outer surface portion is frustoconical.

16. The roller bearing as set forth in claim 14 wherein the end face is non-planar, and wherein the entirety of the end face is engagable with the roller seat.

17. A roller bearing apparatus for supporting a rotatable shaft, the roller bearing apparatus comprising:

an inner ring assembly, the inner ring assembly including an inner diameter surface defining a bore, a sleeve disposed in said bore and mountable on a rotatable shaft to be supported by the roller bearing apparatus, the sleeve including opposite axially spaced apart end portions, an inner ring member supported on the sleeve the inner diameter surface and the sleeve defining therebetween a clearance space for substantially free rotation of the inner ring member relative to the sleeve, and retaining structure on the opposite axially spaced apart end portions of the sleeve, the retaining structure and the inner ring member defining therebetween an axially extending gap to limit retaining structure interference with rotation of the inner ring member relative to the sleeve, an outer ring member, the inner and outer ring members defining therebetween an annular raceway space, and a plurality of rollers in the raceway space and supported by the inner and outer ring members.

18. A roller bearing apparatus as set forth in claim 17 wherein the inner ring includes an inner diameter surface defining a bore, the sleeve being received in the bore, and wherein the inner diameter surface and the sleeve define therebetween a clearance space.

19. A roller bearing apparatus as set forth in claim 17 and further including means for causing the inner ring member to precess relative to the sleeve when the roller bearing apparatus is used in an oscillatory application.

* * * * *